United States Patent [19]

Petersen

[11] 4,013,137
[45] Mar. 22, 1977

[54] ENGINE AIR INTAKE SYSTEM

[76] Inventor: Ross K. Petersen, 2974 W. River Road, Minneapolis, Minn. 55406

[22] Filed: Apr. 25, 1975

[21] Appl. No.: 571,584

[52] U.S. Cl. .............................. 180/69 R; 55/342; 55/385 B; 248/56; 138/107; 137/351
[51] Int. Cl.² ...................................... B62D 25/00
[58] Field of Search ............... 55/385 B, 391, 393, 55/394, 396, 404, 405, 408, 409, 430, 449, 457, 456, 342, 452, DIG. 28, 424; 180/54 A, 69.01, 42, 43, 69 R, 69 C; 285/192, 415, 177, 193, 194; 248/56; 138/106, 107; 137/351

[56] References Cited

UNITED STATES PATENTS

| | | | |
|---|---|---|---|
| 1,102,046 | 6/1914 | Hanson | 285/192 |
| 1,276,321 | 8/1918 | Bropson | 285/42 |
| 1,299,423 | 4/1919 | Bropson | 285/42 |
| 1,434,562 | 11/1922 | Quam | 55/391 X |
| 1,438,553 | 12/1922 | Quam | 55/391 X |
| 1,530,825 | 3/1925 | Grimes | 55/DIG. 28 |
| 1,641,746 | 9/1927 | Donaldson | 55/457 X |
| 1,888,260 | 11/1932 | Clark | 285/415 X |
| 2,081,021 | 5/1937 | Smith et al. | 285/415 X |
| 2,406,852 | 9/1946 | Relf | 285/192 X |
| 2,448,048 | 8/1948 | Porter | 55/404 |
| 2,449,229 | 9/1948 | Hopwood | 285/192 |
| 2,679,911 | 6/1954 | Bhend | 285/177 |
| 2,702,987 | 3/1955 | Nicolin | 285/177 X |
| 2,910,314 | 10/1959 | Klein | 285/177 |
| 2,952,327 | 9/1960 | Farr | 55/385 B |
| 3,207,250 | 9/1965 | Bamford | 55/DIG. 28 |
| 3,357,163 | 12/1967 | Burger et al. | 55/385 B |
| 3,670,480 | 6/1972 | Peterson | 55/430 |
| 3,737,002 | 6/1973 | Yotsumoto | 55/385 B |
| 3,740,932 | 6/1973 | Borsheim | 55/394 |

FOREIGN PATENTS OR APPLICATIONS

| | | | |
|---|---|---|---|
| 2,025,161 | 12/1971 | Germany | 285/192 |
| 284,599 | 4/1931 | Italy | 55/396 |

*Primary Examiner*—Frank W. Lutter
*Assistant Examiner*—David L. Lacey
*Attorney, Agent, or Firm*—Burd, Braddock & Bartz

[57] ABSTRACT

An intake air system for an internal combustion engine having an upright stack mounted on vehicle structure, as a hood, with a stack connecting assembly mount structure having a first plate secured to the stack and a second plate accommodates nut and bolt assemblies to secure the stack to the vehicle hood. An air precleaner is mounted on the upper end of the stack. The lower end of the stack is connected to tubular members which leads to the air cleaner of the engine. The precleaner has a cylindrical house surrounding a separation chamber. A vane assembly has a plurality of circumferentially spaced vanes providing an inlet passage open to the chamber for directing the air and particles into the chamber in a circular motion. A sleeve is centrally attached to the vane assembly and has a central outlet passage for carrying cleaned air from the chamber. An impeller assembly is rotatably mounted on the top wall of the chamber and has a plurality of rotors having paddles located in contiguous relationship with respect to the walls of the chamber and a discharge opening in the housing. The impeller assembly also has a propeller means located in the central outlet passage and rotatable in response to the passage of air through the central outlet passage. Rotation of the propeller produces rotation of the rotor assembly causing the paddles thereof to drive air carrying the entrained particles through the discharge opening.

6 Claims, 8 Drawing Figures

ENGINE AIR INTAKE SYSTEM

BACKGROUND OF THE INVENTION

Prior to the introduction of air into an internal combustion engine, it is desirable to remove from the air, so far as possible, entrained particulate matter such as dirt, dust, sand, snow, and the like. Air cleaners and precleaners in general use for such purpose promote more efficient combustion and longer engine life.

Air cleaners are normally mounted on or adjacent the carburetors of internal combustion engines. This locates the air cleaners under the hoods or cover structures for the engine. Air intake pipes or stacks are used to carry outside air to the air cleaners. Air precleaners located outside of the hoods are mounted on the stacks to provide for the flow of relatively clean air into the stacks. The air cleaners function to further clean the air before it flows into the engine. Air precleaners which have been devised utilize centrifugal force of air circulating within a chamber to separate clean air from air entrained with particulate matter for introduction of the clean air into the carburetor inlet. For example, see U.S. Pat. No. 3,670,480. Stationary deflection blades disposed in an inlet to the chamber impart circular motion to the air flowing through the chamber to centrifugally separate air entrained with particulate matter from clean air. An impeller assembly is used to push the air entrained with particulate matter out of a discharge from the chamber. Such devices, however, do not take full advantage of air movement produced at the carburetor inlet to power the impeller.

SUMMARY OF THE INVENTION

The invention relates to an air intake system for use with an apparatus or machine that requires a supply of relatively clean air. More particularly, the invention is directed to an air intake system for an internal combustion engine. The system has an air intake pipe or stack mounted on vehicle structure with a connecting assembly. The inside end of the stack projects through the vehicle structure and is connected to tubular means leading to and connected to the air cleaner of the engine. An air precleaner mounted on the outside end of the stack functions to separate particulate matter as dirt, dust, sand, snow and the like from air moving through the precleaner.

The precleaner includes a housing having a separation chamber. A vane assembly provides for the introduction of air into the separation chamber in a circuitous path. An outlet passage open to the chamber communicates with the inlet stack of the internal combustion engine. A discharge opening is spaced from the outlet passage and is located on a side wall of the chamber providing a passageway for gas having entrained particulate matter. Movably mounted within the chamber is a rotatable member or impeller. The impeller includes a propeller located in the outlet passage and rotatable in response to movement of air through the outlet passage. The impeller member also includes a plurality of rotor members having paddles located in a contiguous relationship with respect to the discharge opening to force particle entrained air out of the discharge opening.

OBJECTS OF THE INVENTION

An object of the invention is to provide an air intake system for an internal combustion engine that can be mounted on vehicle structure and supports an air precleaner. A further object of the invention is to provide structure for mounting an air intake stack on the hood of a vehicle. Yet another object of the invention is to provide a stack mounting assembly for connecting an air intake stack to a support that is sturdy in construction, reliable and safe in use, and economical to manufacture.

Further objects of the invention will become apparent upon the following description.

IN THE DRAWINGS

DESCRIPTION OF PREFERRED EMBODIMENT

Figure 1:
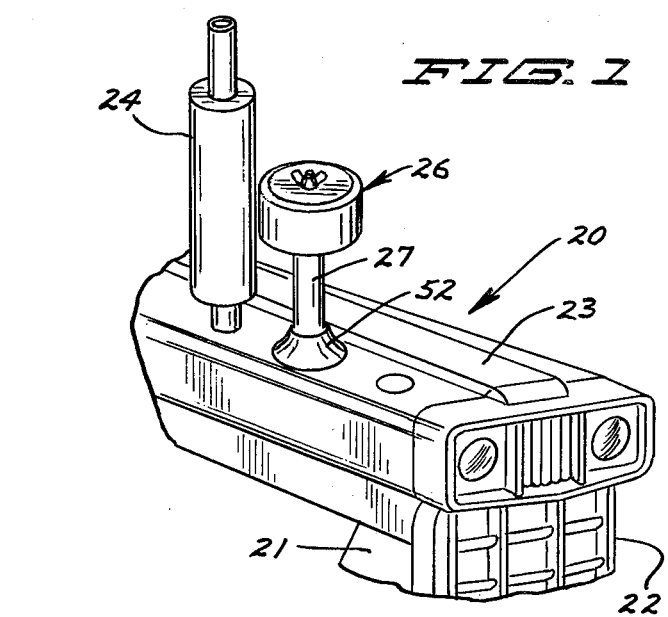
FIG. 1 is a fragmentary perspective view of a vehicle equipped with the air intake system for an internal combustion engine of the invention.
Figure 2:
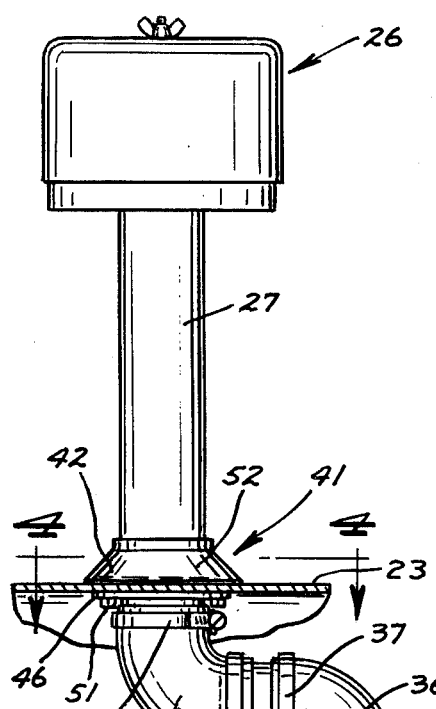
FIG. 2 is an enlarged elevational view of the air intake system of FIG. 1 connected to an air cleaner mounted on a carburetor for an internal combustion engine.
Figure 2:
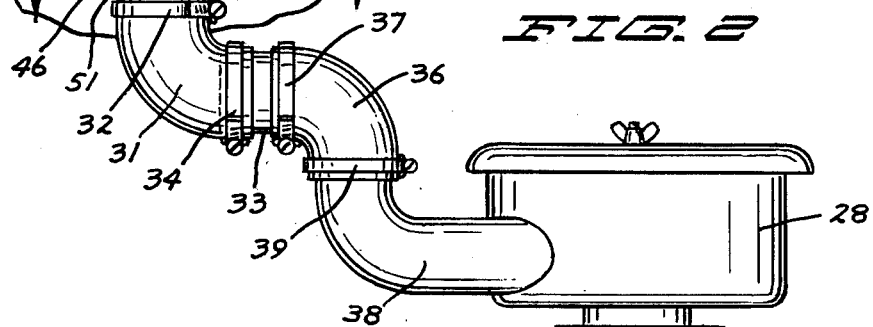
Figure 4:
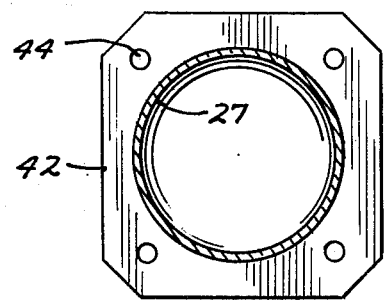
FIG. 4 is an enlarged sectional view taken along the line 4—4 of FIG. 2.
Figure 3:
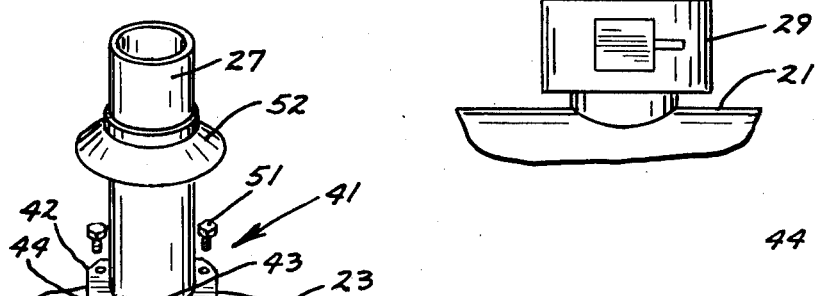
FIG. 3 is an exploded perspective view of the air intake system of FIG. 2.
Figure 3:
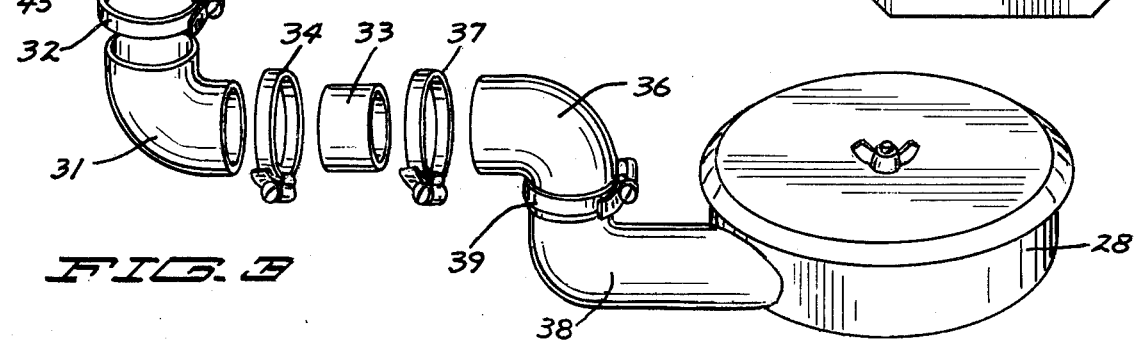

Referring to FIGS. 1 and 2, there is shown a vehicle indicated generally at 20, such as a tractor, truck, bus or like vehicle, having an internal combustion engine 21. Vehicle 20 can be a commercial or industrial vehicle having an internal combustion engine usable both on and off the highway. Vehicle 20 has a front grill 22 and a generally horizontal top hood 23. An exhaust muffler 24 projects upwardly from hood 23.

Located adjacent the exhaust muffler is an air precleaner unit indicated generally at 26. Precleaner unit 26 is mounted on the top of an upright tubular air intake pipe or stack 27. Pipe 27 has a passage which carries air to an air cleaner 28 mounted on top of a carburetor 29. Carburetor 29 is connected to the intake manifold of the internal combustion engine 21. Air cleaner 28 can be connected to the air intake system of a diesel engine. An elbow 31 is connected to the lower end of pipe 27 and retained thereon with a band clamp 32. The opposite end of elbow 31 is mounted on a short pipe or nipple 33 and retained thereon with a band clamp 34. A second elbow 36 is connected to the pipe 33. A band clamp 37 secures the elbow 36 to pipe 33. The opposite end of elbow 36 is mounted on the inlet or intake pipe 38 for the air cleaner 28. A band clamp 39 secures the elbow 36 to intake pipe 38. Elbows 31 and 36 and pipe 33 form tubular means connecting the stack 27 to the gas receiver or air cleaner 28.

A stack mount assembly or mount indicated generally at 41 secures pipe 27 to hood 23. Mount assembly 41 has a first plate or member 42 surrounding pipe 27 and secured thereto by welds or the like. Plate 42 is spaced upwardly from the lower end of the pipe 27, leaving an end projection or section 43. Plate 42 has a plurality of holes 44. Located below hood 23 is a second plate 45 having a plurality of holes 47. Plate 45 has a central opening 46 to receive the lower end 43 of pipe 27. Hood 23 has a hole 48 of a size to accommodate the lower end 43 of pipe 27. As shown in FIG. 2, the end section 43 of pipe 27 extends through hole 48. The plate 45 fits over the end 43. A plurality of fasteners, such as nut and bolt assemblies 51, extend through holes 44, holes 49 in hood 23 and holes 47 to clamp plates 42 and 45 into firm engagement with the opposite or top and bottom sides of hood 23.

A generally inverted cone-shaped hood or cover 52 is positioned about pipe 27 and covers the top of nut and bolt assemblies 51 and plate 42. The cover 52 can be made of rubber, plastic or other suitable flexible material.

The air precleaner 26 can be constructed in accordance with the precleaner of U.S. Pat. No. 3,670,480. Alternatively, the air precleaner may be constructed as shown by the air precleaner 100 in FIGS. 5–8, and U.S. Pat. No. 3,973,937.

Referring to FIGS. 5–8, precleaner 100 is mounted on a lower pressure air intake stack or pipe 111. Intake stack 111 has a passage 112 for directing air, gas or fluids to a selected location. Precleaner 100 is suitable for removal of particulate matter from gas and those environments having a requirement for cleaned gas, however, precleaner has particular use in connection with the air cleaner of an internal combustion engine, as a gasoline or diesel engine.

Such an internal combustion engine may be of the type used on farm tractors, over-the-road trucks, earth moving equipment, industrial engines, and the like. Cleaner 100 serves as a precleaner for separating the air borne particles, as dust, fibers, dirt, sand, and the like, from the air prior to the passage of the air to the air cleaner of the internal combustion engine and thence to the carburetor. The air cleaner operates more efficiently and is prevented from clogging thus extending the life span thereof and promoting clean and efficient combustion in the internal combustion engine.

Cleaner 100 has a tubular or cylindrical housing, indicated generally at 113, defining a separation chamber 114. The housing 113 has an upright cylindrical side wall 116 attached to a domed top wall 117. Both the side wall 116 and the top wall 117 can be integrally fabricated of plastic or metal. Located concentrically within the chamber 114 is a sleeve 118 having a central outlet passage 119 forming the mouth of passage 112. The top of sleeve 118 is open to the approximate mid portion of chamber 114. Snugly located within the sleeve 118 at the lower portion thereof is an adapter collar 121 having an internal diameter of a sufficient dimension to snugly fit over the exterior diameter of a pipe or stack 111. Adapter collar 121 serves as a spacer and is interchangeable with adapter collars of varying internal diameters for use on different sizes of intake stacks. Thus, cleaner 100 is usable on various sizes and makes of internal combustion engines having differing sizes of intake stacks simply by interchanging the adapter collars.

A vane assembly 122 is located at the lower portion of housing 113 to provide air or gas inlet to chamber 114. Vane assembly 122 has a cylindrical frame 123 coextensive with and snugly fitted to the lower internal portion of side wall 116 of housing 113 and fastened thereto by suitable means as screws 124. The sleeve 118 is secured to the frame 123 with a plurality of radially outwardly directed vanes 126 of vane assembly 122. The adjacent vanes 126 are stationary and spaced from each other to provide inlet openings 127 around the sleeve 118 open to the outer area of separation chamber 114. The vanes 126 are inclined upwardly in a circumferential direction to direct inlet air, indicated by the arrows 128 in FIG. 8, in an upward and circumferential or spiral direction into the cylindrical separation chamber 114. The circular movement of air in the chamber 114 establishes centrifugal forces on the particles entrained in the air to carry the particles outwardly against the side wall 116. Air is moved through the inlet openings 127 in response to the low pressure created in outlet 112 of stack 111 as air is drawn therethrough by the internal combustion engine operation. The centrifugal force experienced by the air entering the chamber 114 causes air having entrained particles to move toward the side walls 116 leaving clean air centrally located in the chamber 114.

Figure 5:
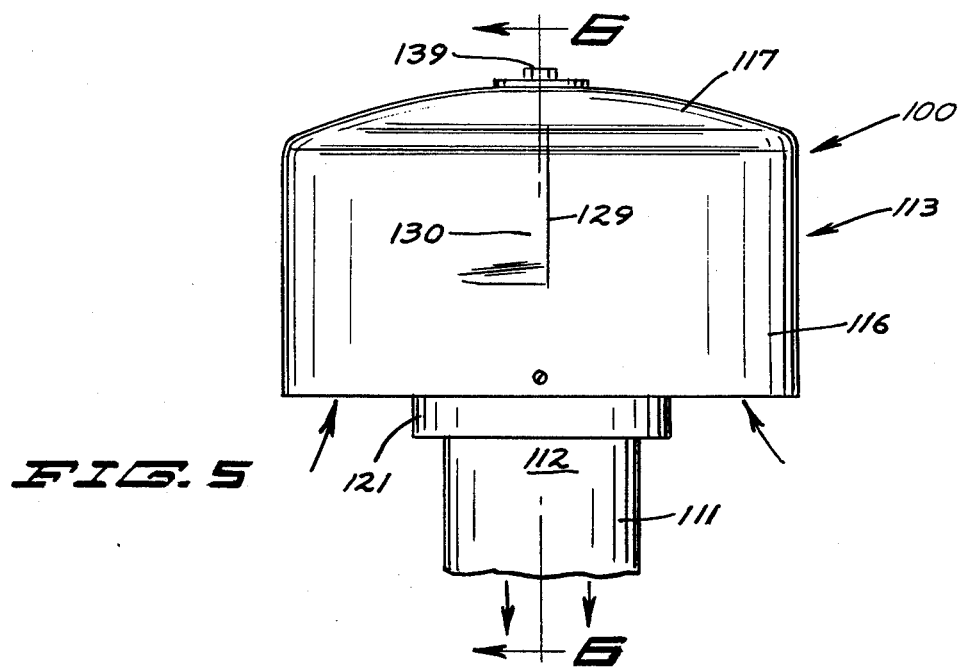
FIG. 5 is a side elevational view of an air precleaner usable with the air cleaning system of the invention.
Figure 6:
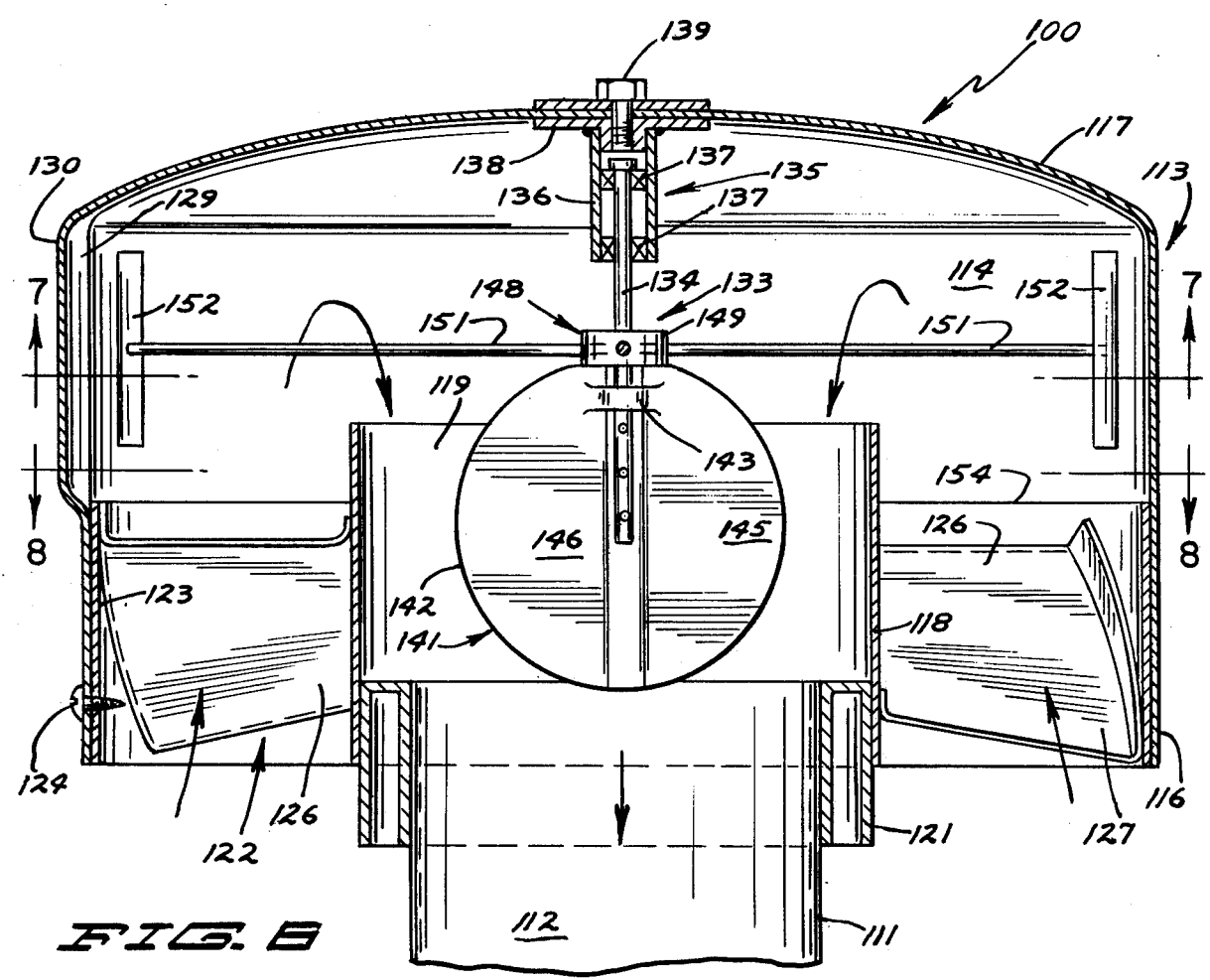
FIG. 6 is an enlarged sectional view taken along line 6—6 of FIG. 5.
Figure 7:
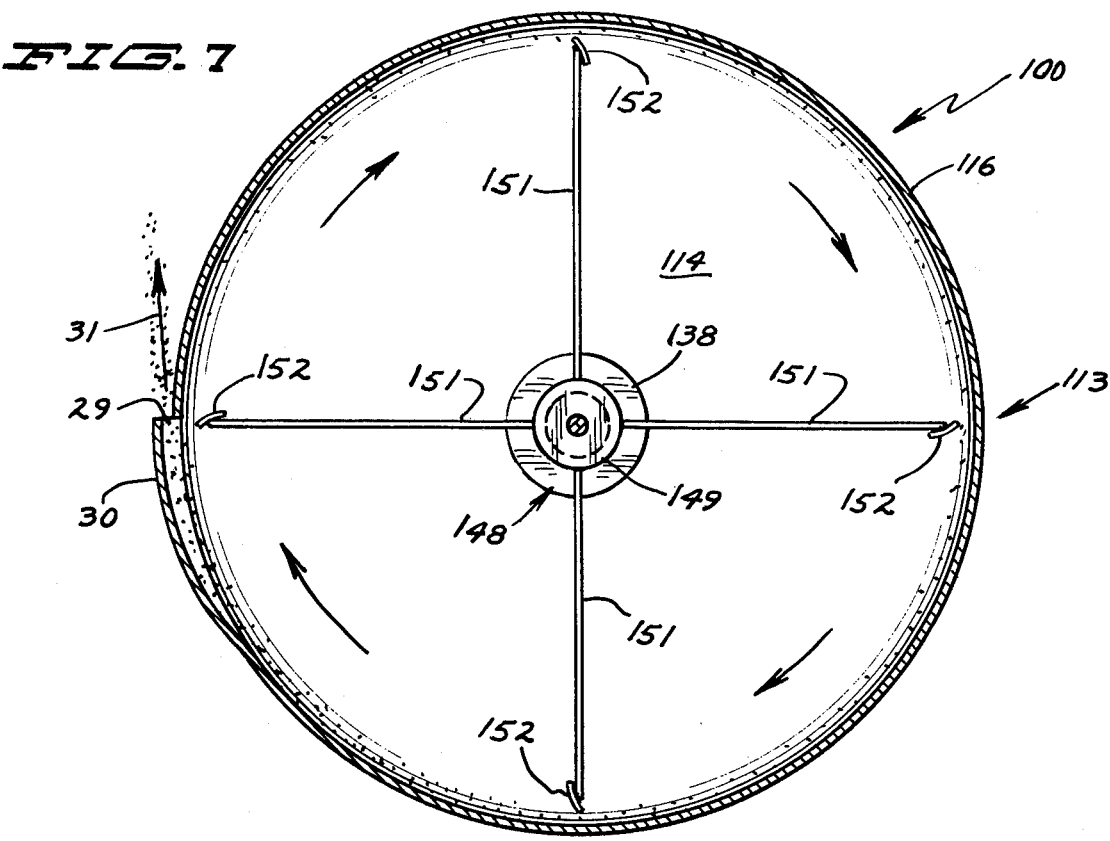
FIG. 7 is a sectional view taken along line 7—7 of FIG. 6.
Figure 8:
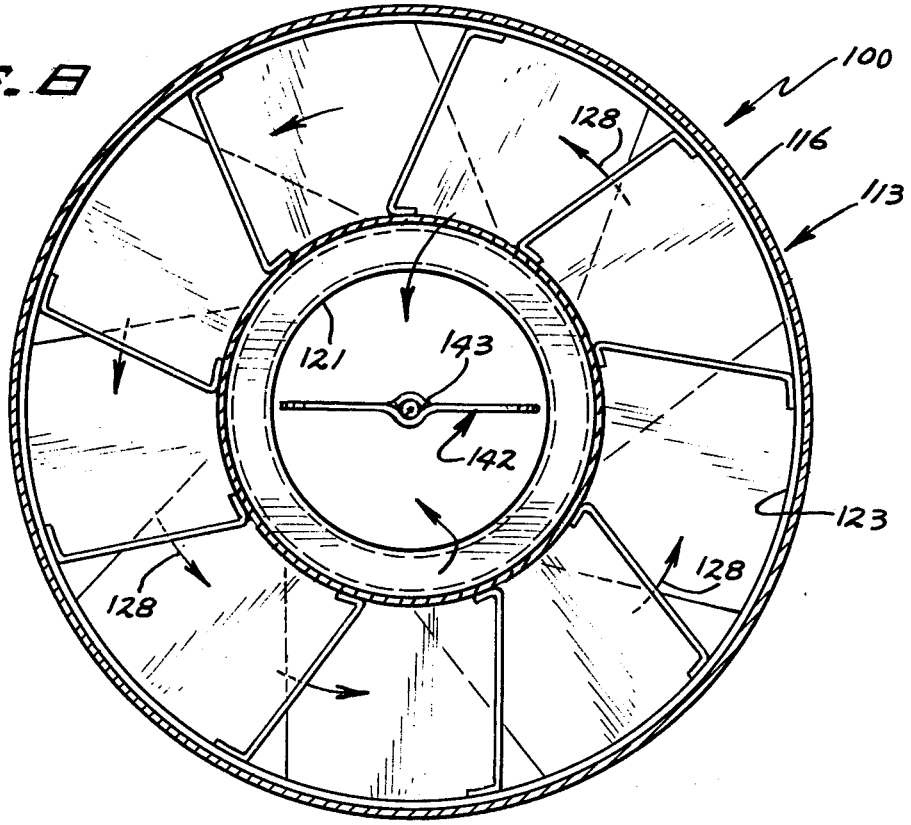
FIG. 8 is a sectional view taken along line 8—8 of FIG. 6.

As shown in FIGS. 5 through 7, side wall 116 of housing 113 has a vertical discharge opening 129 for the discharge of air carrying entrained particulate matter and forced toward side wall 116 by centrifugal forces. Discharge opening 129 is formed by an outwardly extended portion or bump 130 of side wall 116 and is tangentially directed relative to side wall 116 in the direction of air movement in chamber 114. Discharge opening 129 spans the vertical expanse of side wall 116 approximately equal to that portion of chamber 114 above the vane assembly 122. Discharge opening 129 provides for the discharge of air having entrained particulate matter, indicated by the arrow 131 in FIG. 7, which is centrifugally forced outward in chamber 114 toward the side wall 116. The remaining clean air centrally located in chamber 114 passes through the mouth 119 provided by sleeve 118 and thence through passage 112 of intake stack 111 to the internal combustion engine.

A rotatable impeller or spinner assembly 133 is located in chamber 114. Spinner assembly 133 is mounted on a vertical shaft 134 rotatably assembled to bearing assembly 135. Bearing assembly 135 has a casing 136 housing a pair of vertically aligned bearings 137 which engage the upper end of shaft 134. A flange 138 on casing 136 is assembled to the central top portion of domed top 117 by a bolt 139.

Spinner assembly 133 includes a propeller means 141 located in the outlet passage 119 of sleeve 118 and thus in direct communication with inlet passage 112 of intake stack 111 to take maximum advantage of the air flow produced by the low pressure at intake stack 111 to rotate spinner assembly 133. Propeller means 141 is constituted as a flat disc 142 assembled along a diameter thereof to the lower end of shaft 134 of spinner assembly 133 as by engagement of the lower end of shaft 134 with an outwardly notched section 143 of disc 142. The opposing halves of disc 142 on opposite sides of the end of shaft 134 comprise blades 145, 146 rotatable in response to the air flow through the outlet passage 119. Air in circulating motion in chamber 114 entering passage 119 establishes a vortex-like flow or circulation within sleeve 118, impinging upon the blades 145, 146 of disc 142 to cause rotation thereof and of spinner assembly 133.

Spinner assembly 133 also includes a rotor assembly 148 to induce discharge of particle entrained air from the chamber 114 through discharge opening 129. A collar 149 is fixably secured to shaft 134 above disc 142 and in general horizontal alignment with the proximate mid-portion of discharge opening 129. A plurality of arms 151 are equally spaced about the collar 149 and extend radially outward therefrom, having ends contiguous with the inner face of side wall 116 of housing 113. Secured to the outer end of each arm 151 is a paddle 152 constituted as an elongate blade forwardly curved in the direction of rotation of rotor assembly 148. Each blade has a length slightly less than the length of discharge outlet 129. Upon rotation of rotor assembly 148, the paddles 152 sweep along the inside wall of chamber 114, passing in close proximity to the discharge opening 129, to urge the particulate entrained air along the outer extremities of chamber 114 and outward of discharge opening 129. Rotor assembly 148 rotates in response to rotational movement imparted to the disc 142 upon the flow of air through outlet passage 119. The number of arms 151 and paddles 152 can vary according to the size of the cleaner and the speed of rotation of the disc 142. Preferably, the total number and pumping surface of the paddles 152 is proportioned to move a sufficient volume of air out of the separation chamber 114 to eliminate entrained particles and prevent their entry into stack 111.

As shown in FIG. 6, cleaner 100 is optionally provided with an inner peripheral ledge or lip 154 located in the lower portion of chamber 114. Lip 154 extends from the top of frame 123 of vane assembly 122 inwardly toward chamber 114 a short distance. Lip 154 is effective to block interference between air flow coming through the vane assembly 122 and air currents generated by the paddles 152 of rotor assembly 148. Lip 154 increases the efficiency of both the vane assembly 122 and the rotor assembly 148.

In operation of cleaner 100, air is drawn into the chamber 114 through the vane assembly 122 in response to the low pressure created in stack 111 by operation of the internal combustion engine. The incoming air is entrained with particulate matter such as dust, sand, dirt, snow, and the like. As the air passes over the canted vanes 126, a circuitous motion is imparted to it and it circulates about the chamber 114. Centrifugal forces imparted to the air by the circular motion cause particulate matter to be forced to the outer extremities of the chamber 114 while the relatively clean air remains in the central portion thereof. The relatively clean air passes in a circular or vortex-type flow into the intake 119 of sleeve 118 impinging upon the blades 145, 146 of the disc 142 and causing it to rotate. Rotation of the disc 142 imparts rotary movement to rotor assembly 148, moving the paddles 152 along the side walls of the chamber 114. The paddles 152 impart additional circular motion to the air in chamber 114 and urge the particle entrained air outwardly of the discharge slot 129.

The domed top portion 117 of cleaner 100 adds strength to the cleaner 100 and allows a slightly larger discharge opening 129 for more efficient removal of dirt and like particles entrained in the air.

While there has been shown and described a specific embodiment of the invention, it will be apparent to those skilled in the art that certain deviations may be had from that embodiment shown without departing from the scope and spirit of the appended claims.

The embodiments of the invention in which an exclusive property or privilege is claimed are defined as follows:

1. An air cleaning structure for use with a vehicle having a hood with an opening and an internal combustion engine having an air intake manifold comprising: an air cleaner connected to the air intake manifold to provide clean air for the engine, a generally upright tubular stack extended through the opening in the hood, said stack having an upper end above the hood and a lower end below the hood, an air precleaner mounted on the upper end of the stack operable to separate particulate matter from the air and direct clean air into the stack, tubular means secured to the lower end of the stack and the air cleaner connecting the stack to the air cleaner, mount means securing the stack to the hood, said mount means including a generally rectangular and flat first plate located above the hood, said first plate having a hole for accommodating the stack whereby the first plate is located around the stack, means securing the first plate to the stack to fix the position of the first plate on the stack, a generally rectangular and flat second plate located below the hood, said second plate having a hole for accommodating the stack whereby the second plate is located around the stack, and fastening means connecting the corner portions of the first plate with the corner portions of the second plate and the plates to the hood thereby mounting the stack in a fixed position on the hood.

2. The structure of claim 1 wherein: the tubular member secured to the lower end of the stack includes at least one flexible tubular elbow for carrying air to the air cleaner.

3. The structure of claim 1 including: cover means surrounding the stack and located over the first annular plate, said cover means having an annular portion engageable with the stack.

4. The structure of claim 1 wherein: the first plate is held in engagement with the outside of the hood with the fastening means and the second plate is held in engagement with the inside of the hood with the fastening means.

5. Structure for use with gas receiving means and a support having an opening comprising: a tubular stack extended through the opening in the support, said stack having an end located on one side of the support, and a section located on the other side of the support, tubular means secured to the end of the stack and gas receiving means connecting the stack to the gas receiving means whereby gas flows through the stack into the gas receiving means, and mount means securing the stack to the support, said mount means including a first annular flat member surrounding the section of the stack and located adjacent a first portion of the support, means securing the first annular member to the section of the stack to fix the position of the first annular member on the stack, a second annular flat member surrounding the stack and located adjacent a second portion of the support, said first annular member and second annular member being located on opposite sides of the support, and fastening means connecting the first member with the second member and connecting said members to the support thereby mounting the stack in a fixed position on the support.

6. The structure of claim 5 including: cover means surrounding the stack and located over the first member.

* * * * *